United States Patent [19]

Hvolka

[11] Patent Number: 5,190,123
[45] Date of Patent: Mar. 2, 1993

[54] DIRECT DRIVE AXLE BRAKE AND COOLING SYSTEM

[75] Inventor: Dusan J. Hvolka, Salt Lake City, Utah

[73] Assignee: Cannon Engineering Technologies, Inc., Utah

[21] Appl. No.: 724,188

[22] Filed: Jul. 1, 1991

[51] Int. Cl.⁵ .............................................. F16D 55/02
[52] U.S. Cl. ............................ 188/71.6; 188/72.3; 188/264 E; 188/264 P; 188/264 R; 188/170; 188/18 A
[58] Field of Search ............... 188/71.6, 71.5, 72.3, 188/71.1, 72.4, 73.32, 170, 264 R, 264 D, 264 E, 264 P, 264 F, 264 B, 18 A; 192/70.12, 113 R, 113 B

[56] References Cited

U.S. PATENT DOCUMENTS

| | | | |
|---|---|---|---|
| 3,814,222 | 6/1974 | Koivunen | 188/264 P X |
| 4,061,207 | 12/1977 | Ahlen | 188/264 E |
| 4,142,615 | 3/1979 | Sidles, Jr. et al. | 188/71.5 X |
| 4,207,968 | 6/1980 | Chamberlain | 188/71.5 X |
| 4,263,991 | 4/1981 | Morgan et al. | 188/170 |
| 4,269,289 | 5/1981 | Winkler | 188/264 E X |
| 4,491,202 | 1/1985 | Schmitt | 188/71.6 X |
| 4,576,256 | 3/1986 | Rogier | 188/264 D X |
| 4,655,326 | 4/1987 | Osenbaugh | 188/18 A |

Primary Examiner—Dougals C. Butler
Attorney, Agent, or Firm—Marcus G. Theodore

[57] ABSTRACT

A direct drive, self-cooling, fail-safe axle brake system mounted to a drive axle associated with a differential and wheel end of a vehicle. The brake system has two back to back tandem operated combination brake components associated with the wheel end, which is surrounded by a hub cooling and collection reservoir into which fluids from a separate cooling reservoir are circulated over the brake components to dissipate heat generated from braking by dissipating it through the separate cooling reservoir.

16 Claims, 5 Drawing Sheets

DIRECT DRIVE AXLE BRAKE AND COOLING SYSTEM

BACKGROUND OF THE INVENTION

1. Field

This invention relates to brake systems. More particularly, it relates to a dual brake, self-cooling, fail-safe direct drive axle brake system mounted to a wheel end unit, such as a differential gearing system or an hydraulic drive motor, and a direct drive wheel. It is positioned to apply brake force at either low or high speeds, and employs a cooling system to effectively disperse heat build-up during braking.

2. State of the Art

A number of conventional brake systems for vehicles with and without separate cooling systems are known. For example, Blatt, U.S. Pat. No. 4,470,487 discloses a fail-safe brake for a drive shaft, which includes means by which the brakes are spring activated upon interruption of the source of pressure fluid. The Blatt invention engages brake pads adapted to operatively move against a flywheel attached to a sleeve journaled through bearings and keyed to the drive shaft. Blatt requires high pressures and large pressure pads to overcome the high torque of the flywheel. Richardson, U.S. Pat. No. 4,363,384, discloses a disc brake assembly for tractors carried within a differential housing immediately to the rear of a transmission housing. Richardson is mounted to the rear of the transmission which supports a disc brake adapted to engage discs on the output shaft of the transmission. It is used primarily as a disc parking brake, not as a service brake, because of the extreme torque which would have to be overcome at this position to stop the drive shaft. Schmitt, U.S. Pat. No. 4,491,202, discloses a disc brake assembly for heavy duty vehicles with interchangeable brake modules. Schmitt requires a liquid circulating in a closed circuit to cool the large braking discs conventionally mounted inside a rim of a wheel, because of the high torque generated in this wheel location.

Hause, U.S. Pat. No. 3,323,389 discloses a live axle having a final drive, a drive differential, and braking structure to control drive differential output. The position of the Hause braking system is such that it fails to take advantage of the lower axle torque before being increased by the wheel hub planetary drive ratio, and thus requires large brake pads. These large brake pads generate extreme heat, which must be dissipated with an elaborate liquid cooling system. Thompson et al., U.S. Pat. No. 4,377,094, is an example of a combination liquid cooled hydraulic disc brake and cooling system for a tracked vehicle which also requires an elaborate cooling system. The brake body is adapted for installation on the steering differential of a tracked vehicle in controllable braking engagement to one of the rotating braking axles. Thompson et al. requires large brake pads and a separate brake cooling system to minimize brake repairs. As the service brake components are not located near the ends of the track drive sprockets, peripheral access for brake repairs is more difficult.

Kolvunen, U.S. Pat. No. 3,814,222, is a final drive differential and brake mechanism for a vehicle in which the differential has two outputs, one for each drive axle. A disc brake pack is arranged to brake both outputs to provide a vehicle service brake. Again the brake disc pack is positioned to apply braking torque at a point after the torque has been increased by the wheel hub planetary, and therefore requires large brake pads and a separate cooling system. Chauveau et al., U.S. Pat. No. 4,566,563, is a hydraulically activated multi-plate disc type of brake journal mounted at the end of an axle of a vehicle to brake it through the intermediary of a reduction gear mechanism. Chauveau et al. also requires a cooling system to dispose of heat buildup, but better positions the brake assembly for easy access.

Figure 2:
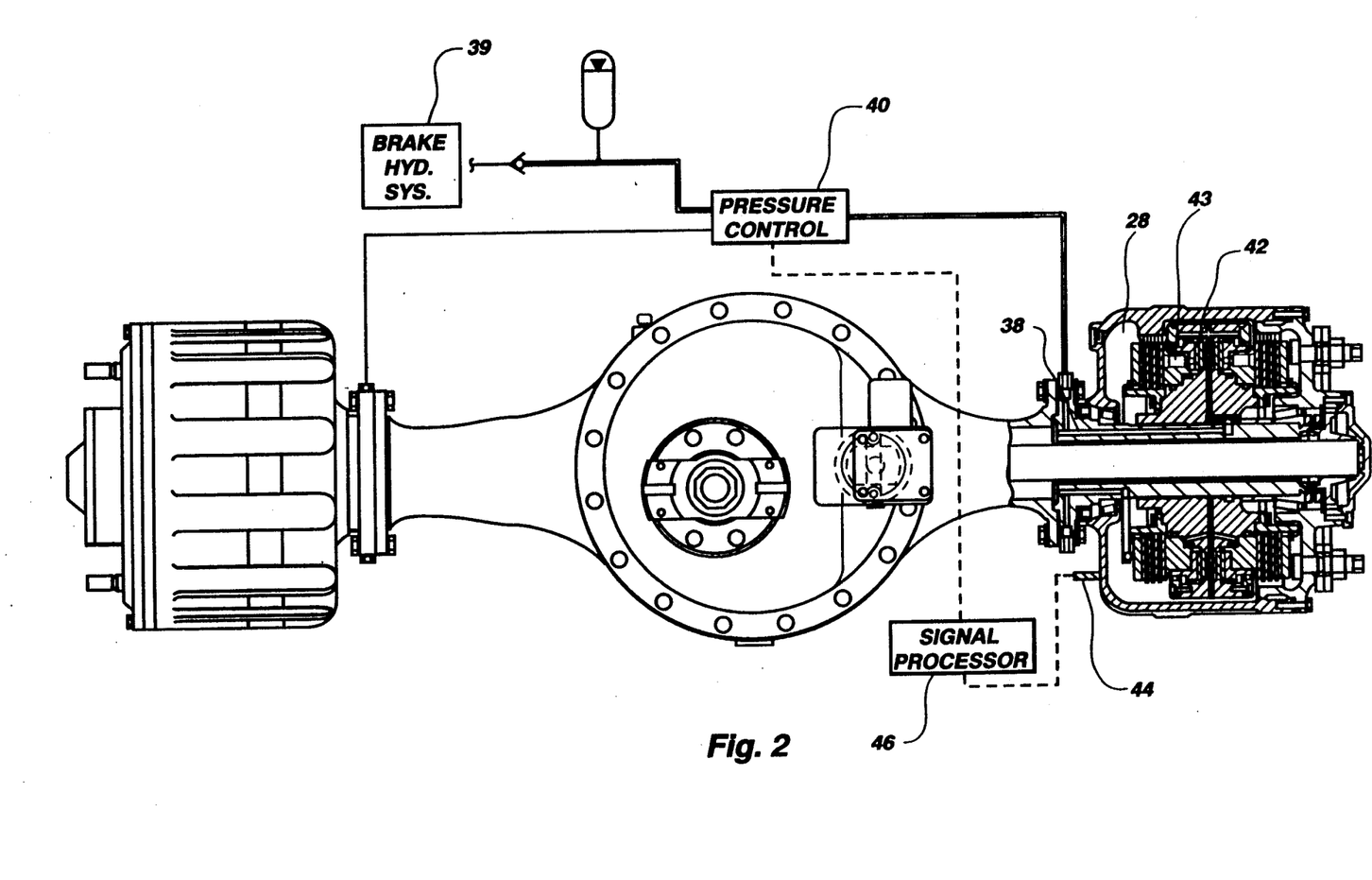
FIG. 2 is another side cross-sectional view of the retardation system schematic of the wheel end of the invention shown in FIG. 1.

A number of integrated dual brake mechanisms are also known. Cronin, U.S. Pat. No. 4,667,784, discloses a dual brake mechanism for a vehicle having a first disc brake assembly associated with the first output drive member and a second disc brake assembly associated with an opposite second output drive member. Although Cronin provides a dual brake mechanism which can be compactly integrated with a steering differential and a secondary parking brake actuator, it does not attach the brake system directly to the axle at a point for braking before the wheel hub planetary increases the drive torque before applying the brakes. Morgan et al., U.S. Pat. No. 4,263,991, also discloses a combined fail-safe and service brake having the brake positioned between the motor drive and the gearbox as shown in FIG. 2.

Keese, U.S. Pat. No. 4,037,694 places multiple friction brakes at the out end of the planetary reduction system splined to the end of the shaft near the wheel hub, applying force after the torque of the shaft has been increased by the wheel hub planetary gearing system.

Chamberlain, U.S. Pat. No. 4,207,968 is a double disc type brake system including two disc packs respectively placed in a back to back relationship. Multiple pistons are positioned in a common actuator arrangement centrally disposed between the two disc packs to operate both disc packs. For light braking the piston actuates only the first disc pack. For heavier braking, both disc packs are actuated. Chamberlain has its brake housing operably interconnected to a sun gear in the double reduction final drive gearing assembly. Chamberlain therefore also applies its braking force after the torque of the shaft has been increased by the wheel hub planetary gearing system.

Jirousek et al., U.S. Pat. No. 4,391,351, discloses an inboard self lubricating manually activated emergency or parking brake for fork lifts with very small central hubs. The manually activated disc brake is directly attached to the wheel end of the shaft. To lubricate the Jirousek et al. disc brake, the shaft is surrounded by a tube actuator in communication with the differential to deliver lube oil from the differential to lubricate the disc brakes. The light weight Jirousek et al. manual fork lift brake is unsuited for use as a high speed service brake for large heavy duty vehicles having large brake drums which generate extreme heat build up during braking.

Co-pending "Inboard Self Cooling Three Function Fail Safe Brake System", Ser. No. 627,053, is an example of a self cooling inboard axle brake system positioned to apply braking force to vehicle traveling at low speeds under 25 mph to apply a brake force at points along the axle to take advantage of the smaller axle torque before being increased by the planetary drive gear ratio of the wheel hub. This brake system attached directly to the axle lacks bearing stabilization proximate the wheel end and is therefore subject to vibration at higher speeds, which interferes with the braking function.

Parker, U.S. Pat. No. 1,315,236, discloses a disc brake assembly adjacent to the differential assembly. Isbel et al., U.S. Pat. No. 3,102,608, provides separate disc braking assemblies for parking and service brake activation. Kovonagi, Japanese Patent No. 0223,342; Sidles, Jr. et al., U.S. Pat. No. 4,142,615, and Shinoda, U.S. Pat. No. 4,294,334, disclose various disc brake assemblies. Stritzel, U.S. Pat. No. 3,994,375, discloses another disc brake assembly. Klein, U.S. Pat. No. 4,327,414 discloses a sensor and ECU to achieve desired or predetermined braking in a system.

Cited for general interest are: Euler, U.S. Pat. No. 4,128,145, which is a combination fail-safe brake and one-way clutch particularly adapted for use with power trains for cranes; Jones et al., U.S. Pat. No. 3,995,722 provides a fail-safe actuator for a disc brake system particularly adapted for use with heavy duty disc brakes of railroad vehicles, automotive trucks, and airplanes; Daniels, U.S. Pat. No. 3,946,838, provides a fail-safe disc brake actuated with slant coil springs; Kendig, U.S. Pat. No. 2,998,101, discloses a safety brake for tandem axle trailers; Parker, U.S. Pat. No. 1,315,236 discloses an enclosed multiple-disk brake mechanism for tractors, which applies its braking force after the torque of the shaft has been increased by the wheel hub planetary gearing system; Windish et al., U.S. Pat. No. 4,560,034 provides a disc brake hydraulic control system having an automatic parking brake function when hydraulic pressure is below a certain operating level, a service brake function when pressure is above a predetermined operating level, and an emergency braking function upon loss of hydraulic pressure; and Winkler, U.S. Pat. No. 4,269,289, discloses a multiple liquid cooled friction disc brake which is low in direct and indirect parasitic energy consumption.

Co-pending "Improved Outboard Axle Brake System", Ser. No. 627,052 discloses a self-cooling hydraulic brake system positioned outboard between the planetary gear drive and wheel hub to apply brake force after the axle torque is increased by the planetary drive gear of the wheel hub for use with conventional or hydraulically driven wheel end brake designs. The invention requires critically sized brake components to insure proper heat dissipation of the heat generated during braking.

None of these inventions provides a self-cooling, dual brake, fail-safe, direct drive axle brake system utilizing easy access brake disk sub-assemblies positioned for use with conventional wheel end units for travel at low and high speeds. The invention, described below, provides such an invention.

SUMMARY OF THE INVENTION

The invention is an improved modular single function or four function fail safe self-cooling hydraulic dual brake system for an axle system having a shaft with a splined end operably associated with an hydraulically driven unit, such as a differential gearing system or an hydraulic drive motor, and a direct drive wheel end.

The invention comprises a brake housing journal mounted to the wheel end of the shaft. A wheel hub casing is attached to the end of the shaft and is bearing mounted to surround and encase the brake housing as it rotates with the shaft. The wheel hub casing has walls defining a hub reservoir in communication with and filled by a liquid coolant reservoir containing oil or hydraulic fluid similar to that activating the differential. In embodiments associated with an hydraulic drive wheel end, the cooling reservoir is preferably filled with similar hydraulic fluid as that associated with the hydraulic drive wheel end. This coolant is delivered to the hub reservoir via circulation passages in the brake housing which is connected to an independent cooling reservoir via hydraulic hose means.

The interior of the wheel hub casing and the exterior of the brake housing are structured to rotate in passing registration. A plurality of stator brake discs are radially spaced around the interior of the wheel hub casing between the brake housing and the wheel hub casing. A plurality of corresponding axially displaceable rotor brake discs are attached to the exterior of the brake housing and structured to engage the stator brake discs, when activated and axially displaced. Hydraulic activation passages in the brake housing are in communication with a pressure activation system via hydraulic hoses to activate the displaceable rotor discs to activate the same. The pressure activation system, i.e. an hydraulic piston system, or mechanical spring system, is operably associated with the rotor discs to selectively axially displace said rotor discs in response to differing pressures within the hydraulic activation circuit to engage the stator discs in one mode, and retract said rotor discs to disengage from the stator discs in the other mode.

Because the direct drive axle brake system does not employ a planetary gearing system, preferably two sets of large conventional brake disc components are employed back to back on the wheel end to provide sufficient braking force to stop the vehicle at high speeds. This use of a conventional brake disc design generates cost savings by allowing use of standardized mass produced brake components. The number and size of the brake components can be selected to provide the braking force required over wide operating loads and ranges without concern about heat build-up during braking. After selecting and sizing the desired brake components, the cooling reservoir capacity and circulation flow rates is then increased to provide the necessary cooling to minimize distortion of the braking function caused by heat build-up. The direct drive axle brake system is therefore self cooling, and not limited in operating range and capacity. It is also not necessary to install additional axle brake assemblies along the axle shaft next to the differential housing and the wheel hub to stop large heavy duty vehicles.

The hub reservoir is sized to hold sufficient coolant for collection and absorption of the heat generated during braking. The shape of the coolant reservoir is structured to encase and be in communication with both brakes to collect and dissipate heat build-up from these sources. The hub reservoir is defined by the walls of the casing, and is in communication with the walls of the housing, which aid in dissipating the heat absorbed in the hub reservoir. A plurality of delivery and return circulating passages is located in the brake housing and lead into the hub reservoir. These circulating passages are also in communication with the cooling reservoir to form a circuit to transfer coolant into and out of the hub reservoir via circulation means, such as a pump. This pump may be independently associated with the differential to circulate hydraulic fluids from the coolant reservoir through the delivery circulation passages and into the wheel hub reservoir to cool the brakes. This creates a vacuum in the return circulation passages to withdraw heated coolant from the hub reservoir for return to the coolant reservoir for cooling. In addition, circulation blades or vanes may be mounted within the wheel hub casing in a manner similar to that described in the co-pending "Improved Outboard Axle Brake System" to circulate coolant into and out of the wheel hub reservoir in response to the rotation of the wheel end.

By locating the wheel hub reservoir in this position, effective absorption of heat generated during braking is accomplished. Also, the size and capacity of the wheel hub reservoir may be increased by enlarging the circumference of the casing and hub reservoir for efficient cooling without interfering with the operation of the wheel hub, or access to the wheel end for repairs. This, in turn, reduces the capacity and size required of the separate cooling reservoir.

The coolant reservoir is mounted to the vehicle in a position, such as on top of the differential housing, where it is exposed to air flowing over the reservoir when the vehicle is in motion. It may employ fins or vane structure in the coolant reservoir walls to aid in the dissipation of heat into the surrounding ambient air. The coolant reservoir capacity and circulation rate of the coolant throughout the cooling circuit is then sized to dissipate heat generated during braking under worst case ambient air conditions, since the coolant reservoir does not have significant space limitations.

Preferably, the wheel hub casing includes a removable cover proximate the wheel end of the shaft, which can be removed to expose the brake components for repair or replacement. A removable inspection pin may also be included in the wheel hub casing for manual or electronic inspection of the thickness of the brake liner.

When actuated by an hydraulic system, the improved direct drive axle brake system also may include fail safe biasing means, such as a spring, associated with the hydraulic activation system in a manner to force the rotor brake discs to engage the stator brake discs in the event of loss of hydraulic line pressure. In combination brake embodiments, the hydraulic activation means are generally structured as a circuit with separate hydraulic fluid lines having ports associated with each rotor brake disc such that the hydraulic activation circuit activates selected rotor brake discs to work as a service brake during normal vehicle operations in one mode, and the remaining rotor brake discs are activated for parking and emergency operations in the other mode. This is usually accomplished with a pressure regulator to selectively pressurize desired segments of the hydraulic line circuits with varying system pressures to selectively activate brake components responding to differing pressures. For example, in one embodiment a spring is placed initially in a position to force the rotor brake discs to engage the stator brake discs. An opposing hydraulic piston is positioned to overcome the spring and disengage the brakes during normal vehicle operations in response to the release of the brake pedal.

This hydraulic piston may also be controlled by a micro-processor which pressurizes the hydraulic circuit acting on the spring in response to a signal from a solid state wheel speed sensor. When the wheel speed signal indicates the wheel speed in rpm's is above a pre-determined value, the micro processor sends a signal to the hydraulic piston to maintain positive pressure, (during normal operations the pressure is in excess of 900 psi pressure) to overcome the spring pressure and selectively release the brake discs so that there is no retardation braking. If the wheel speed signal shows that the wheel is spinning above the pre-determined value, the micro processor sends a signal to the hydraulic piston to decrease the hydraulic pressure and allow the spring to apply retardation braking force. In the event of hydraulic pressure loss either through an emergency leak, or when the vehicle is shut off, the spring forces the rotor brake discs to engage the stator brake discs as an emergency or park brake to stop the vehicle. Thus adapted, the direct drive axle brake system acts as a four function wheel end retardation system.

In one preferred embodiment, similar solid state wheel speed sensors and direct drive axle brakes are arranged to monitor wheel speeds on all wheels so that if one wheel speed goes to zero, a signal is sent to increase pressure in the hydraulic lines to that the spring is overcome to release the brakes and wheel to free its motion. Thus configured, the direct drive axle brake system would release braking action and act as an ABS-Type system.

Alternatively, to avoid premature engagement caused by the hydraulic activation system leaking and causing the spring to prematurely engage, the axle brake system components may be configured to be selectively activated directly by using the piston to cause the rotor brake discs to engage the stator brake discs. This direct activation circuit may be configured to activate combination brake components to work as either service brakes or emergency/parking brakes. Sensor means are usually associated with the hydraulic activation means to activate the rotor brake discs to engage as an emergency or park brake in the event of hydraulic pressure failure or loss. For example, the hydraulic fluid lines to the brake housing and wheel casing stator brake discs may be interconnected in an hydraulic activation control circuit. This control circuit is designed such that the rotor discs are initially engaged as a park brake in one mode if the hydraulic circuit is pressurized below a first predetermined pressure. When additional positive pressure is applied after vehicle start-up, the rotor brake discs are released freeing the wheel end to rotate. As increased pressures within the hydraulic lines above a second predetermined pressure are interposed by activating the brake pedal, the service brakes are activated to operate as a service brake in the second mode. In the event of hydraulic pressure loss, the stator brake discs engage automatically as an emergency brake.

Preferably, the hydraulic activation circuit is designed so that the service brakes of the direct drive axle brake system are located in the wheel hub for ready access for brake pad replacement and repair. By placing the service brakes near the wheel hub, field brake repairs are also undertaken more readily.

At high speeds, this embodiment provides superior braking over inboard axle brake systems by self cooling the brake components to prevent distortion of the brake discs' effectiveness. It also provides more flexibility to employ and accommodate different sizes and types of brake discs over other outboard axle brake systems, which do not have an independent cooling reservoir.

The invention thus provides an improved self-cooling, modular fail-safe direct drive axle brake system, which effectively maintains the brake function over wide vehicle operating ranges and load capacities.

DESCRIPTION OF THE ILLUSTRATED EMBODIMENTS

Figure 1:
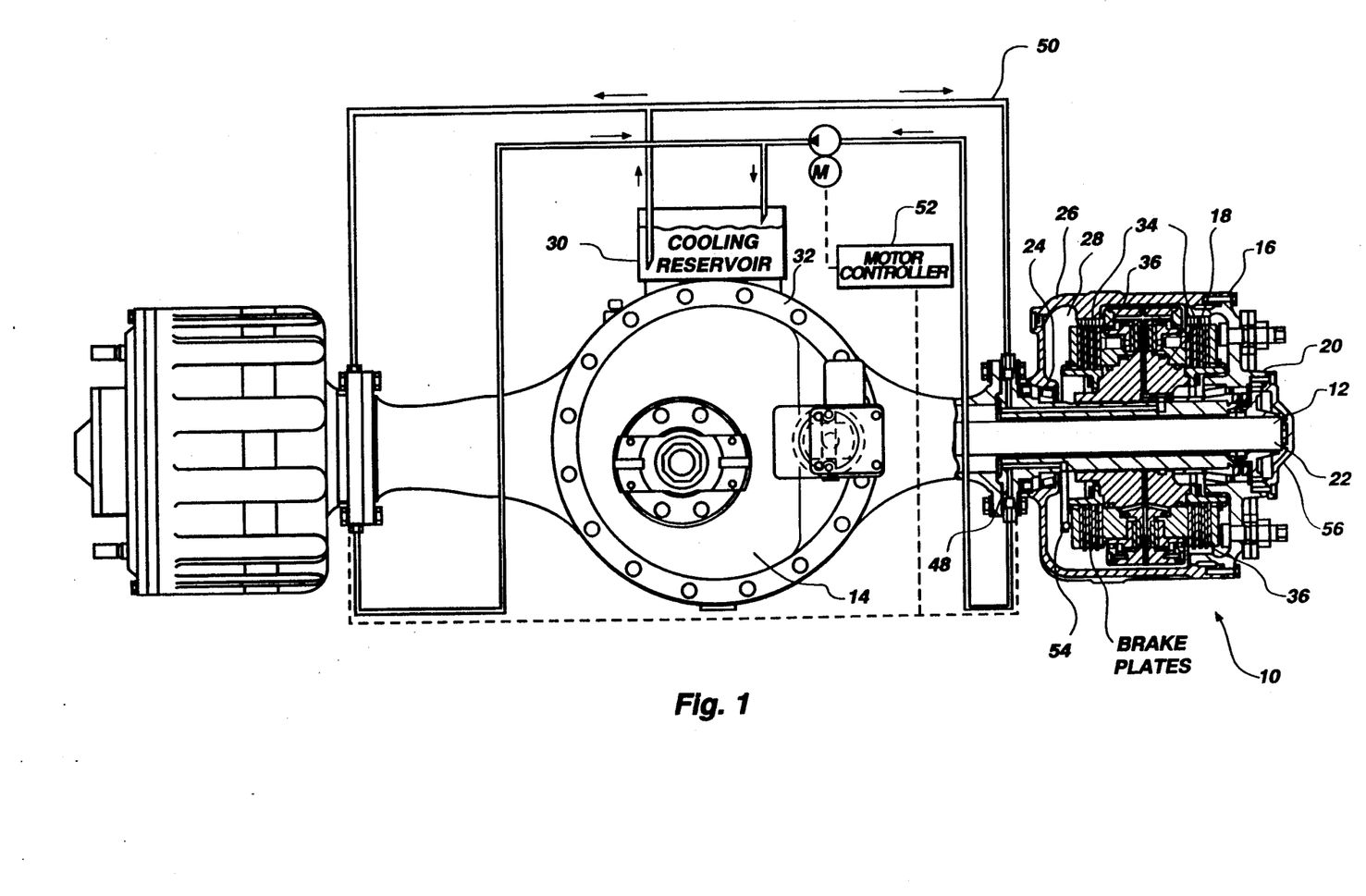
FIG. 1 is a side cross-sectional view of the cooling system schematic of the wheel end of one preferred embodiment of the invention.

FIG. 1 illustrates a cross sectional side view of one preferred embodiment of the invention 10 bearing mounted to a drive axle shaft 12 configured as a four function fail safe self-cooling hydraulic dual brake system. The invention is configured as a direct drive axle system having a shaft 12 with a splined end operably associated with an hydraulically driven differential gearing system 14. The other end of the shaft 12 is associated with a wheel end 16 having no planetary drive system.

The invention 10 comprises a brake housing 18 journal mounted to the shaft 12 proximate its wheel end 16. A wheel hub casing 20 is attached to the end 22 of the shaft and bearing 24 mounted to surround, encase, and rotate around the brake housing 18 as the shaft 12 rotates. The wheel hub casing 20 has walls 26 defining a hub reservoir 28 filled with hydraulic fluid coolant from a liquid coolant reservoir 30 mounted on the differential housing 32.

The interior of the wheel hub casing 20 and the exterior of the brake housing 18 are structured to rotate in passing registration. Two sets of stator brake discs 34 are mounted back to back to the interior of the wheel hub casing 20 between the brake housing 18 and the wheel hub casing 20. Corresponding sets of axially displaceable rotor brake discs 36 are attached to the exterior of the brake housing 18 and structured to engage the stator brake discs 34, when activated and axially displaced. Hydraulic activation passages 38 in the brake housing 18 shown in the FIG. 2 Four Function Wheel End Retardation System Schematic are in communication with the hydraulic brake system 39, and lead to a pressure control hydraulic piston activation system 40 to pressurize the hydraulic lines 41 and release a mechanical spring 42 from forcing the displaceable rotor discs 36 to engage the stator brake discs 34. The mechanical spring 42, is operably associated with the rotor discs 36 to selectively axially displace said rotor discs 36 to engage the stator discs 34 in one unpressurized system mode, and retract said rotor discs 36 to disengage from the stator discs 34 in the other pressurized system mode. To provide adequate brake retardation force for the direct drive axle brake system 10, two sets of large conventional brake disc components 34,36 are employed back to back to provide sufficient braking force to stop vehicles travelling at high speeds.

The illustrated brake components 34,36 are combination brakes which respond to different pressures. They are selectively activated as either service brakes or parking/emergency brakes by employing an hydraulic circuit which varies the activation pressures within the lines. Generally, the hydraulic circuit includes a spring return 42 which initially engages the brake components 34,36 when the pressure is below a pre-determined value. The hydraulic piston system 43, utilizing a pressure control 40, then raises the hydraulic line pressure to overcome the spring return 42 to disengage the brake discs 34,36 freeing the wheels for travel. Thus, with an hydraulic pressure control 40 included, the hydraulic piston system 43 is designed such that the rotor discs 36 are initially engaged as a park brake in one mode if the hydraulic piston system 43 is pressurized below a predetermined pressure. When additional positive pressure is applied after vehicle start-up, the rotor brake discs 36 are released freeing the axle shaft 12 to rotate. As increased pressures within the hydraulic lines are interposed by activating the brake pedal (not shown) associated with the pressure regulator 40, the rotor brake discs 36 are activated to operate as a service brake in the second mode. In the event of hydraulic pressure loss, the rotor brake discs 36 automatically engage the stator brake discs 34 to operate as an emergency brake.

One preferred spring return 42 is structured to initially engage the stator and rotor brake discs 34,36 as an emergency/park brake when the hydraulic pressure is below 1,500 psi. At the 1,500 psi pressure, the hydraulic piston 43 overcomes the spring return 42, forcing the rotor discs 36 to disengage the stator discs 34 to enable the axle shaft 12 to drive the wheel end 16 of the vehicle.

Figure 3:
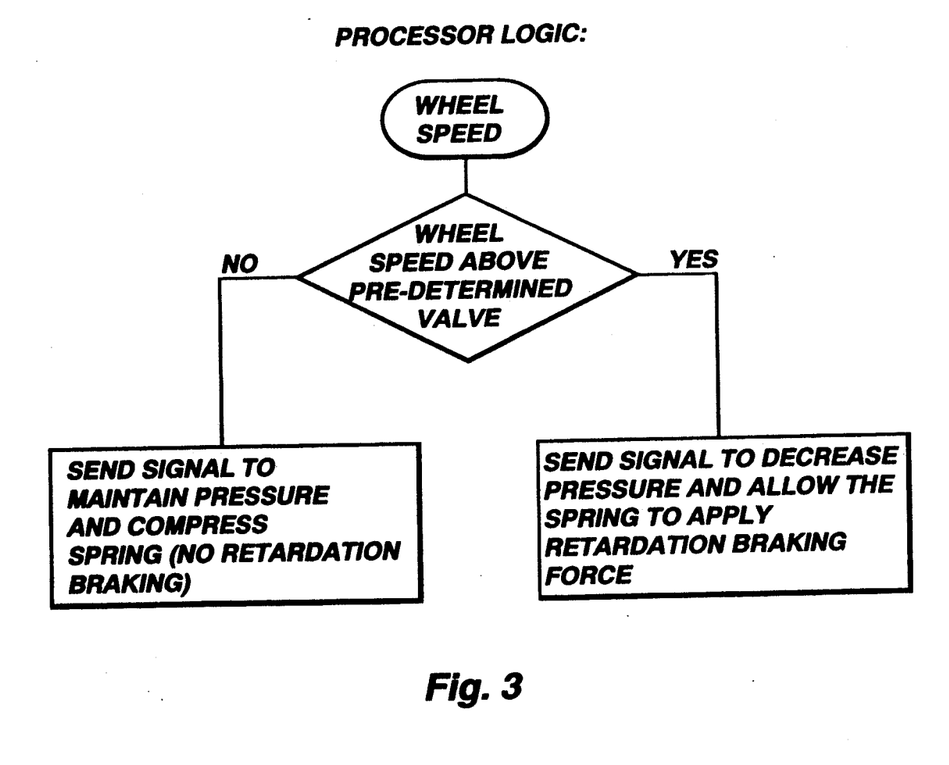
FIG. 3 is a schematic view of the micro processor logic of the signal processor shown in FIG. 2.

A solid state wheel speed sensor 44 shown in FIG. 2 may be attached to the wall 26 of the wheel hub casing 20 to detect and send a signal that the wheel end 16 is moving. A signal processor 46 receives the signal and processes the same via a micro processor circuit shown in FIG. 3. The signal processor 46 has a pre-set wheel speed logic circuit, which sends a signal in one mode for the pressure control 40 to maintain pressure and compress the spring so that there is no retardation braking if the wheel speed is not above the pre-determined value. If the wheel speed exceeds the pre-determined value, the signal processor 46 sends a signal to the pressure control 40 to decrease the hydraulic pressure in the hydraulic lines to allow the spring 42 to apply retardation braking force.

The hub reservoir 28 is sized to hold sufficient coolant for collection and absorption of the heat generated during braking. The shape of the hub reservoir 28 is structured to encase and be in communication with both brakes sets 34, 36 to collect and dissipate heat build-up from these sources. The hub reservoir 28 is also in communication with the wheel hub casing 20, the brake housing 18, and walls 26 to dissipate partially the heat absorbed during braking.

By locating the hub reservoir 28 in this position, effective absorption of heat generated during braking is effectuated. Also, its size and capacity may be increased by enlarging the circumference of the casing 20 and hub reservoir 28 to dissipate heat without interfering with the operation of the wheel hub 16, or access to the wheel end for repairs. This, in turn, reduces the size required to the cooling reservoir 30.

A plurality of delivery and return circulating passages 48 shown in FIG. 1 are located in the brake housing 18 leading into the hub reservoir 28 and are in communication with the cooling reservoir 30 via tubing means 50. A motorized pump controller 52 is associated with the cooling reservoir 30 to circulate hydraulic fluids into the hub reservoir 28 to cool the brakes. This creates a vacuum in the return circulation passages 48 to withdraw heated coolant from the hub reservoir 28 for return to the coolant reservoir 30 for cooling. A thermal sensor 54 mounted to the brake housing 18 within the hub reservoir 28 is included to send a signal to the motor controller 52 to increase the circulation of the coolant into and out of the hub reservoir 28 if the temperature of the coolant exceeds a pre-determined value.

The coolant reservoir 30 is mounted to the vehicle on top of the differential housing 32 where it is exposed to air flowing over the differential 14 as the vehicle travels. It may employ fins or vane structure (not shown) in the coolant reservoir walls to aid in the dissipation of heat into the surrounding ambient air.

Preferably, the wheel hub casing includes a removable cover 56 proximate the wheel end 22 of the shaft 12, which can be removed to expose the brake components 34, 36 for repair or replacement.

The improved direct drive axle brake system 10 also uses the spring 42, to force the rotor brake discs 36 to engage the stator brake discs 34 in the event of loss of hydraulic line pressure as a fail safe system.

Figure 4:
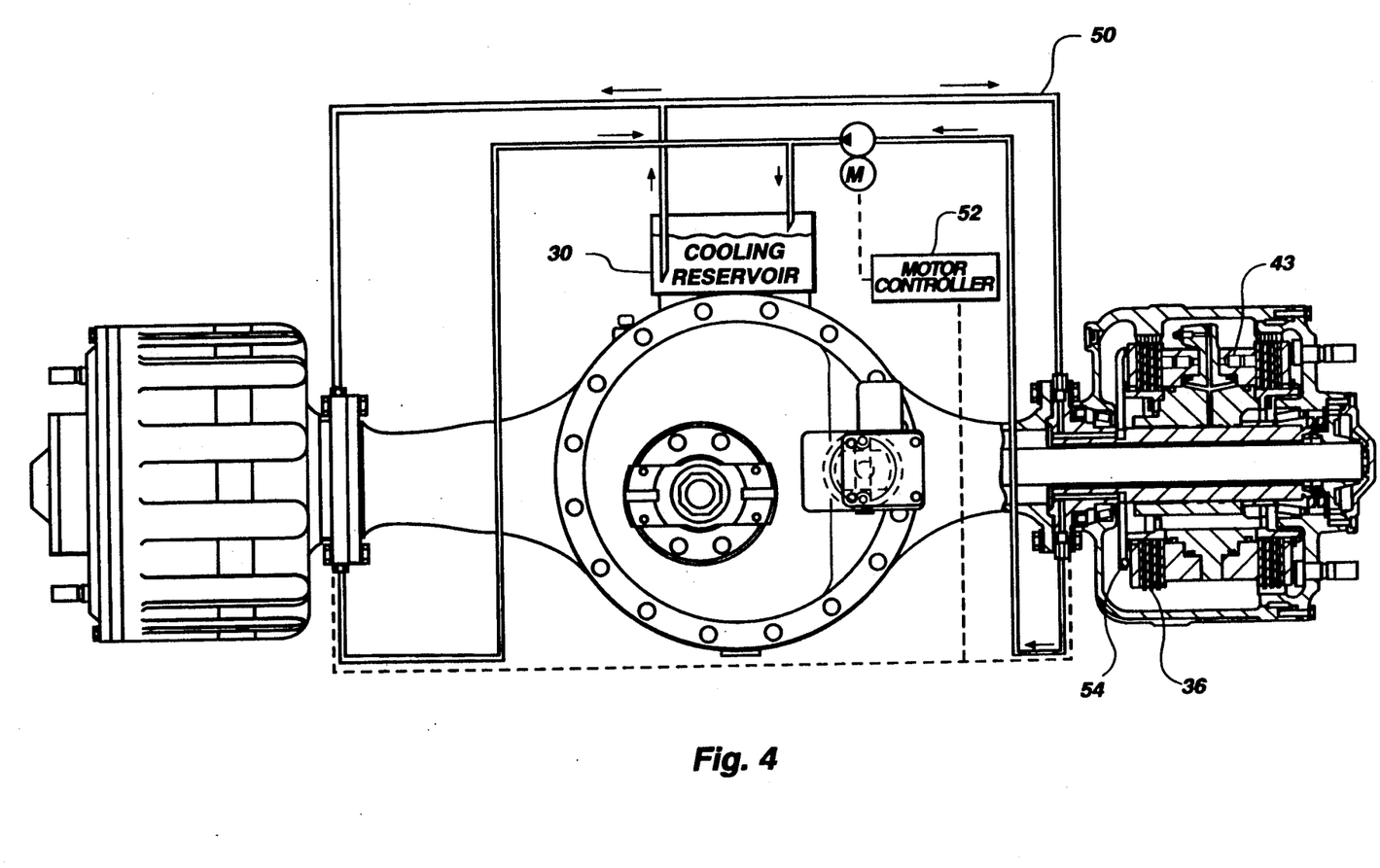
FIG. 4 is a side cross-sectional view of the cooling system schematic of a single function wheel end.

Alternatively, to avoid premature engagement caused by the hydraulic activation system leaking and causing the spring 42 to prematurely engage the brake system components 34, 36, the direct drive axle brake system 10 may be configured as a single function axle brake system to be selectively activated by using the piston 43 to directly cause the rotor brake discs 36 to engage the stator brake discs 34, as that shown in the FIG. 4 Single Function Wheel End Cooling System Schematic of a direct drive axle brake system. The spring 42 is omitted, and the hydraulic pistons 43 are part of a hydraulic circuit with a pressure control 40 similar to that shown in FIG. 2. The pressure control 40 directly activates the hydraulic pistons 43 to force the rotor brake discs 36 to contact the stator brake discs 34 to work as a service brake during normal vehicle operations in one mode. In the other mode, the rotor brake discs 36 are activated by the pressure control 40 to contact the stator brake discs 34 for parking and emergency operations in the event of hydraulic loss of pressure. Sensor means (not shown) are usually associated with the hydraulic activation means to activate the rotor brake discs to engage as an emergency brake in the event of hydraulic pressure failure.

Figure 5:
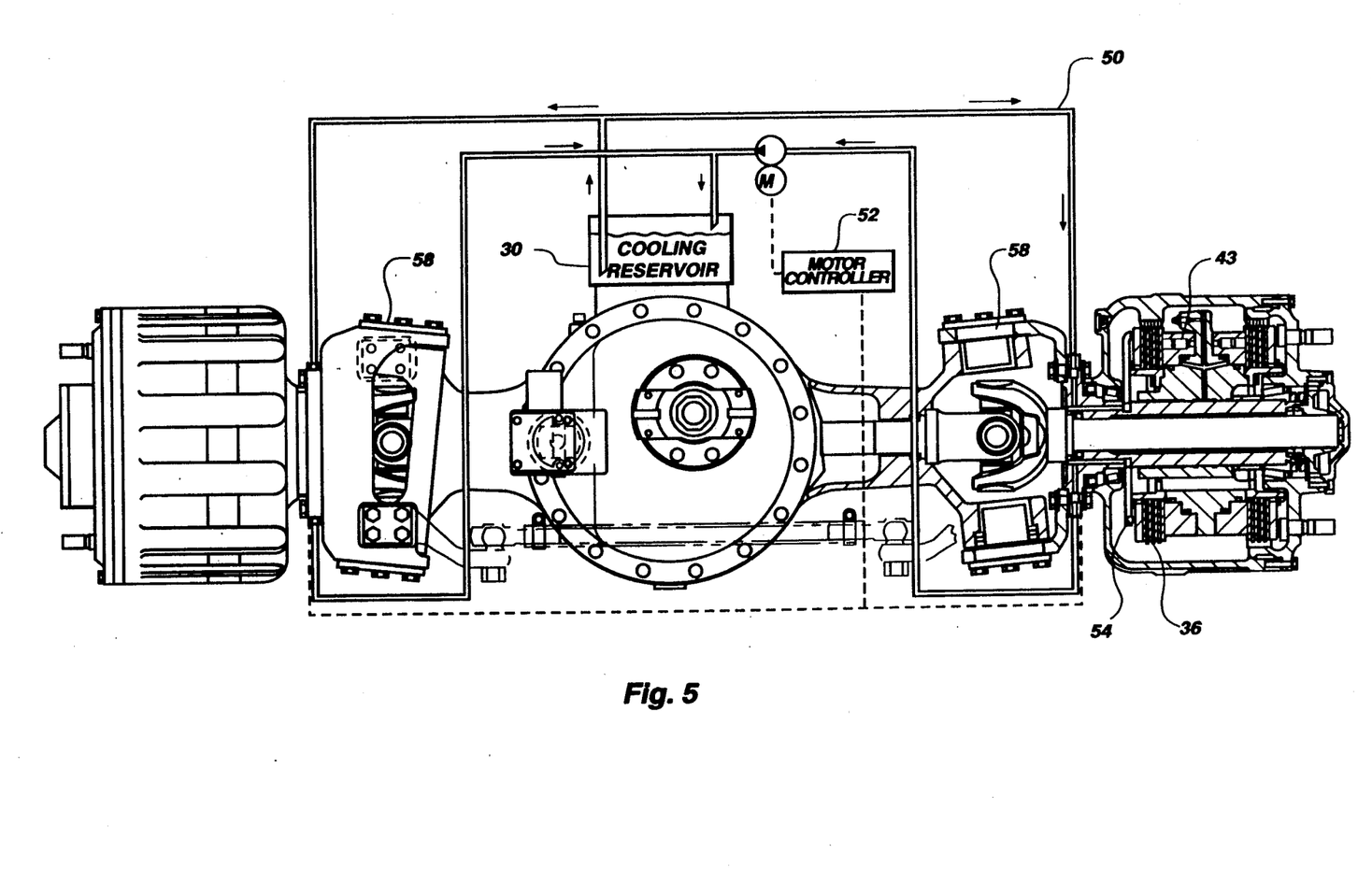
FIG. 5 is a side cross-sectional view of the cooling system schematic of a single function steerable axis wheel end.

FIG. 5 is a Single Function Wheel End Cooling System Schematic direct drive axle brake system associated with a steerable axis 58.

Although this specification has made reference to the specific embodiments, it is not intended to restrict the scope of the appended claims. The claims themselves recite those features deemed essential to the invention.

I claim:

1. A direct drive self cooling hydraulic brake system for an axle system having an axle shaft with a splined end operably associated with an hydraulic drive unit and another end operably associated with a wheel end and wheel hub, comprising:
    i. a coolant reservoir filled with hydraulic fluid,
    ii. at least one hydraulically activated axle wheel brake component having
        a. a brake housing with exterior walls journal mounted to the axle shaft proximate the wheel end, said brake housing having hydraulic drive passages, and coolant circulation passages,
        b. a corresponding wheel hub brake casing with interior walls attached to the axle shaft and structured to surround and encase the brake housing such that the interior walls of the wheel hub brake casing rotate in passing registration with the exterior walls of said brake housing, said casing interior walls defining a hub reservoir surrounding and encasing the brake components, and in communication with the circulation passages to deliver and withdraw hydraulic fluids,
        c. a plurality of stator brake discs radially spaced around the exterior walls of the brake housing,
        d. a plurality of corresponding rotor brake discs attached to the interior walls of the brake casing and operably associated with the hydraulic drive passages to be axially displaced by increased pressure in the drive passages, and structured to engage the stator brake discs, when displaced;
    iii. pressure control activation means operably associated with the hydraulic drive passages associated with the rotor brake discs to selectively axially displace said rotor brake discs to engage the stator brake discs and stop the wheel hub from turning in one mode, and to retract said rotor brake to disengage the stator brake discs to free the wheel hub in another mode, and
    iv. a coolant circuit in communication with the circulation passages and coolant reservoir to deliver and withdraw coolant from the wheel hub reservoir, and
    v. circulation means to circulate the hydraulic fluids within the wheel hub reservoir about the axle wheel brake components to absorb heat generated during braking and transport the same to the cooling reservoir to dissipate said heat by cooling the coolant before recirculation through the wheel hub reservoir to cool the brake components.

2. A directt drive self-cooling axle brake system according to claim 1, wherein the pressure control activation means is a micro-processor circuit selectively activating a piston system to vary hydraulic activation pressures such that under a pre-determined first pressure within the circuit, the rotor brake discs engage as a parking brake in the first mode; at hydraulic pressure in excess of the first predetermined pressure, the rotor brake discs release contact with the stator brake discs allowing the wheel hub to rotate in the second mode; and at additional increased pressure above a second pre-determined pressure the rotor brake discs engage as a service brake in the third mode; and loss of hydraulic pressure re-engages the rotor brake discs as an emergency brake in the fourth mode.

3. A direct drive self-cooling axle brake system according to claim 2, wherein the pressure control activation means includes a mechanical biasing spring system initially biased to extend and engage the rotor brake discs with the stator discs, and opposed by a piston which selectively increases the hydraulic pressure within the hydraulic drive passages to overcome the spring bias and release the brake discs to free the wheel end to turn.

4. A direct drive self-cooling axle brake system according to claim 3, including structuring biasing means opposing the pressure control activation means to force the rotor brake discs to engage the stator brake discs as an emergency brake in the event of the loss of hydraulic pressure.

5. A direct drive self-cooling axle brake system according to claim 1, including two hydraulically activated axle wheel brake components mounted back to back on the axle brake casing to be simultaneously activated in tandem by increased pressure in the hydraulic drive passages.

6. A direct drive self-cooling axle brake system according to claim 3, including a solid state wheel speed sensor attached to the wheel end which transmits a signal to a signal processor associated with the pressure control activation means to maintain pressure within the hydraulic activation circuit and compress the spring system allowing the wheel end to turn freely if the wheel speed is below a pre-determined value in one mode; and to decrease pressure within the hydraulic activation circuit to allow the spring system to apply retardation braking force if the wheel speed is above the pre-determined value in a second mode.

7. A direct drive self-cooling axle brake system according to claim 1, including a removable cover proximate the wheel end of the shaft, which can be removed to expose the brake components for repair or replacement.

8. A direct drive self-cooling axle brake system according to claim 1, wherein the brake components are combination service and emergency/park brakes selectively activated at different pressures in the hydraulic drive circuit, such that at hydraulic pressures under a pre-determined first limit within the circuit, the brake disc components of the emergency/park brake engage as a parking brake in the first mode; increased pressure in excess of the first pre-determined limit within the pressure control circuit releases the emergency/park brake components allowing the wheel hub to rotate in the second mode; additional increased pressure within the circuit above a second pre-determined limit activates the service brake components for use as a service brake in the third mode; and loss of hydraulic pressure re-engages the emergency/park brake components for use as an emergency brake in the fourth mode.

9. A direct drive self cooling axle brake system according to claim 8, including pressure sensing means associated with the hydraulic system to provide signals to a micro processing unit which selectively activates selected rotor discs to engage the stator discs to provide the desired braking characteristics.

10. A direct drive self cooling axle brake system according to claim 1, including a thermal sensor attached to the brake housing within the wheel hub reservoir to detect temperature increases of the hydraulic fluid within the wheel hub reservoir, transmit a signal to the circulation means to increase the circulation within the wheel hub reservoir if the temperature is above a pre-determined value.

11. A direct drive self cooling axle brake system according to claim 10, wherein the circulation means comprises a motorized pump.

12. A direct drive self-cooling hydraulic brake system for an axle system having an axle shaft with a splined end operably associated with an hydraulic drive unit and another end operably associated with a wheel end and wheel hub, comprising:

i. a coolant reservoir filled with hydraulic fluid,
ii. two hydraulically activated axle wheel brake components mounted back to back on exterior walls of a brake housing journal mounted to the axle shaft proximate the wheel end, said brake housing having interconnecting hydraulic drive passages to activate the dual brake components in tandem, and coolant circulation passages,
iii. a corresponding wheel hub brake casing with interior walls attached to the wheel end of the axle shaft and structured to surround and encase the exterior walls of the brake housing such that the interior walls of the wheel hub brake casing rotate in passing registration with the exterior walls of said brake housing, said casing interior walls defining a wheel hub reservoir surrounding and encasing the brake components, and in communication with the circulation passages to deliver and withdraw hydraulic fluids,
iv. a thermal sensor attached to the interior walls of the casing defining the wheel hub reservoir to sense and transmit signals if the temperature of the hydraulic fluid within the wheel hub reservoir exceeds a pre-determined value,
v. a plurality of stator brake discs radially spaced around the exterior walls of the brake housing,
vi. a plurality of corresponding rotor brake discs attached to the interior walls of the brake casing and operably associated with the hydraulic drive passages to be axially displaced by increased pressure in the drive passages, and structured to engage the stator brake discs, when displaced;
vii. an hydraulic piston system activated by a brake pedal operably associated with the hydraulic drive passages leading to the rotor brake discs to selectively axially displace said rotor brake discs to engage the stator brake discs and stop the wheel hub from turning in one mode, and to retract said rotor brake discs to disengage the stator brake discs to free the wheel hub in another mode, and
viii. a coolant circuit in communication with the circulation passages, and coolant reservoir to deliver and withdraw coolant from the wheel hub reservoir; and
ix. a motorized pump and receiver which responds to signals from the thermal sensor to circulate the hydraulic fluids within the coolant circuit and coolant reservoir into the wheel hub reservoir and about the axle wheel brake components to absorb heat generated during braking and transport the same to the cooling reservoir to dissipate said heat before recirculation of the coolant through the wheel hub reservoir to cool the axle wheel brake components.

13. A direct drive self-cooling axle brake system according to claim 12, wherein the hydraulic piston system includes an opposing mechanical return spring initially biased to extend and force the rotor brake discs to engage the stator brake discs, and opposed by a piston which selectively overcomes the return spring bias to release the stator brake discs to free the wheel end to turn in response to increased hydraulic pressure within the hydraulic drive passages.

14. A direct drive self-cooling axle brake system according to claim 13, including structuring the spring to opposing the hydraulic piston system to force the rotor brake discs to engage the brake discs as an emergency brake in the event of the loss of hydraulic pressure.

15. A direct drive self-cooling axle brake system according to claim 13, including a solid state wheel speed sensor attached to the wheel end which transmits a signal to a signal processor associated with the hydraulic piston system to maintain pressure within the hydraulic drive passages and compress the spring allowing the wheel end to turn freely if the wheel speed is below a pre-determined value in one mode; and to decrease pressure within the hydraulic drive passages to allow the spring to apply retardation braking force if the wheel speed is above the pre-determined value in a second mode.

16. A direct drive self-cooling axle brake system according to claim 15, including a plurality of similar solid state wheel speed sensors mounted on the wheel hubs of a plurality of direct drive axle brakes, and arranged to monitor wheel speeds of the respective wheel ends so that if a wheel hub speed goes to zero, a signal is sent to increase pressure in the respective hydraulic activation passages so that its spring pressure is overcome to release the brake components to free the wheel hub.

* * * * *